May 6, 1930.  W. F. PRICE ET AL  1,757,546
BATTERY PLATE FILLING MACHINE
Filed April 17, 1929   5 Sheets-Sheet 1

Fig. 1.

INVENTORS
WILLIAM F. PRICE
RUDOLPH H. BECK
BY
Warren E. Willis.
ATTORNEY

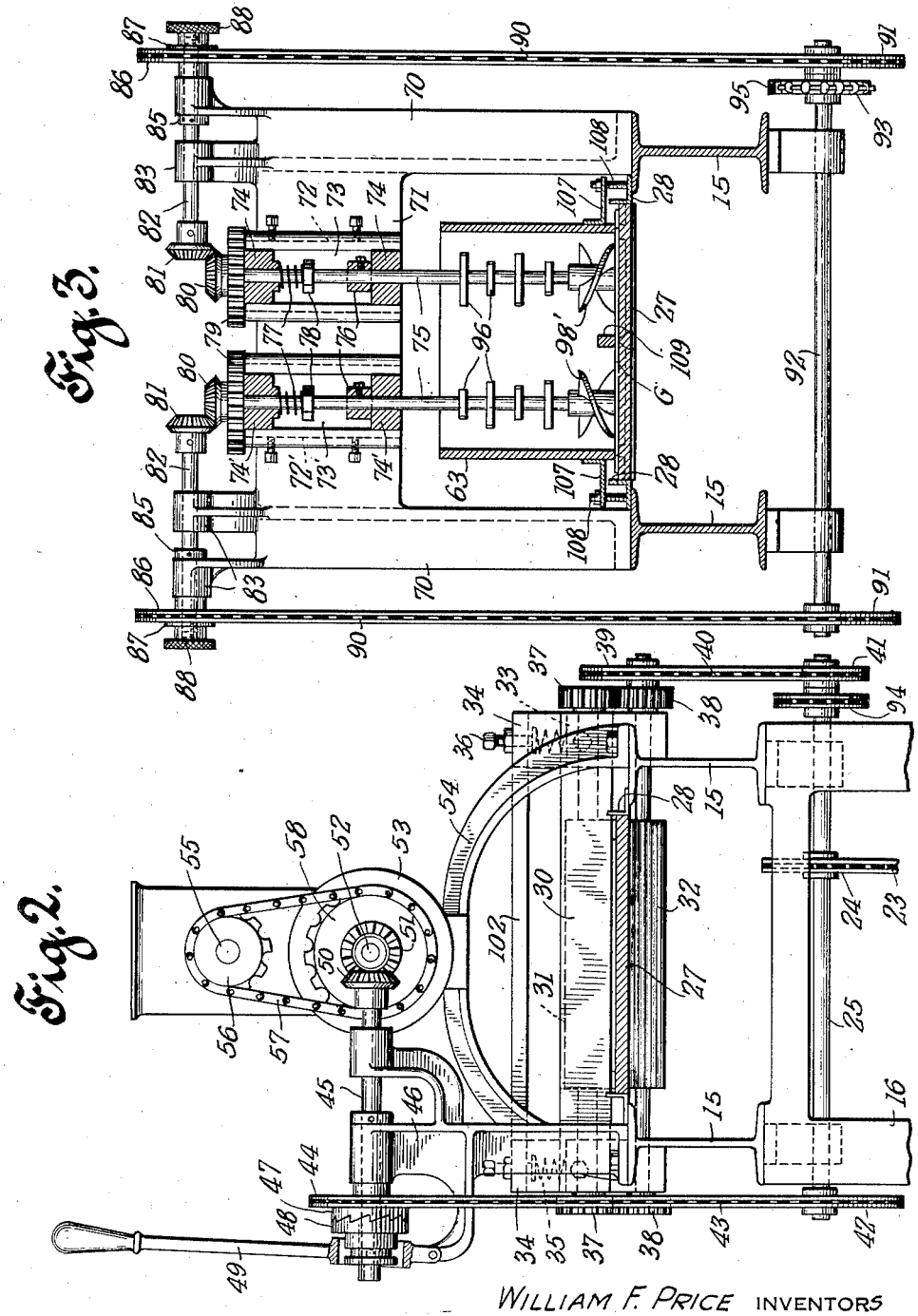

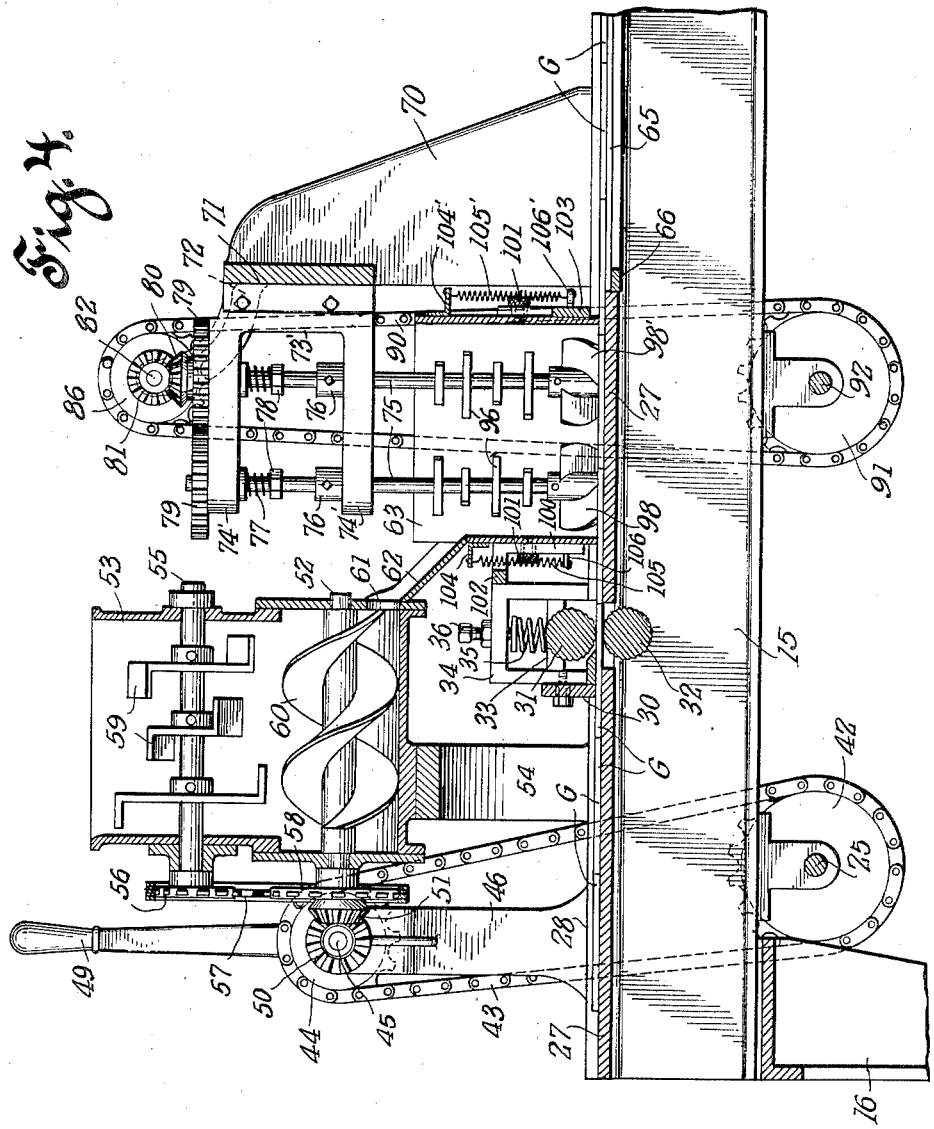

May 6, 1930. W. F. PRICE ET AL 1,757,546
BATTERY PLATE FILLING MACHINE
Filed April 17, 1929 5 Sheets-Sheet 4
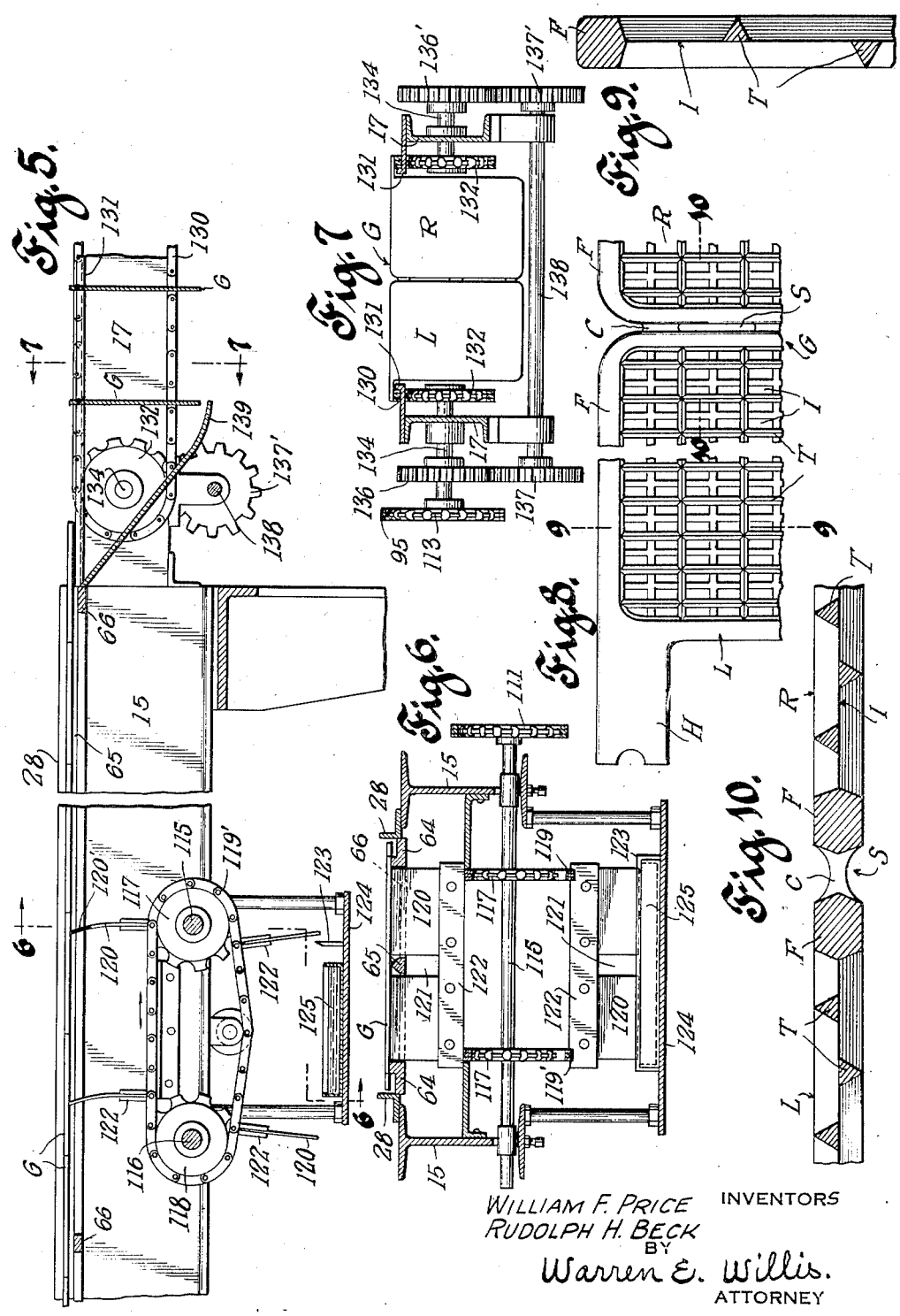
INVENTORS
WILLIAM F. PRICE
RUDOLPH H. BECK
BY
Warren E. Willis.
ATTORNEY May 6, 1930.  W. F. PRICE ET AL  1,757,546
BATTERY PLATE FILLING MACHINE
Filed April 17, 1929  5 Sheets-Sheet 5
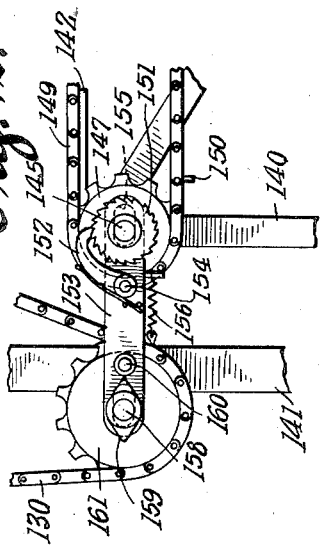
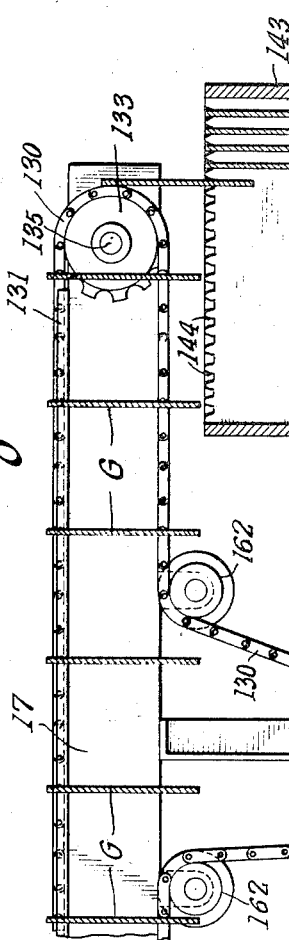
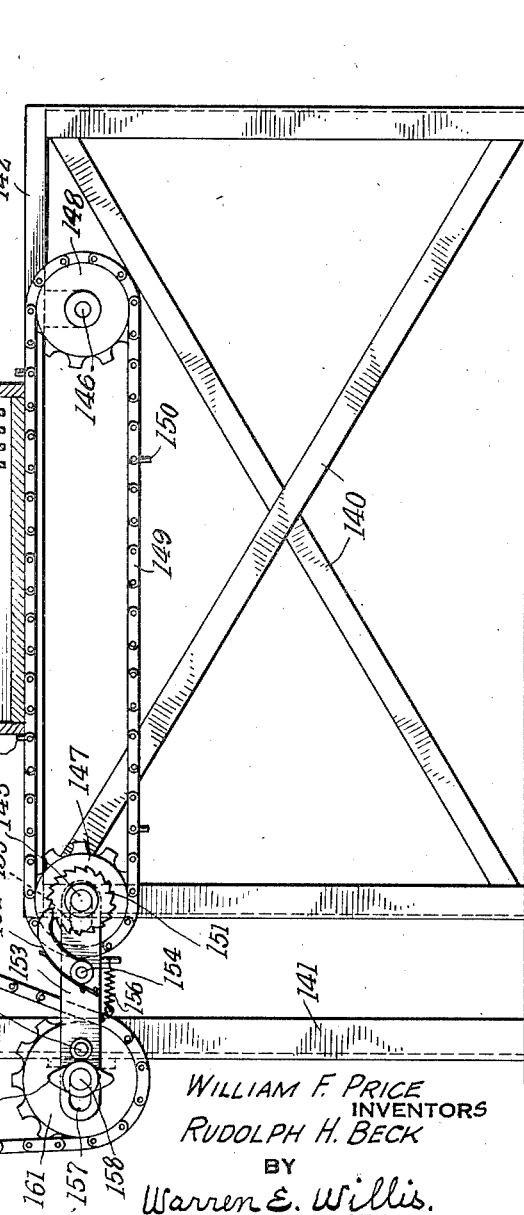
WILLIAM F. PRICE
RUDOLPH H. BECK
INVENTORS
BY Warren E. Willis
ATTORNEY Patented May 6, 1930

1,757,546

UNITED STATES PATENT OFFICE

WILLIAM F. PRICE, OF BALA, AND RUDOLPH H. BECK, OF UPPER DARBY, PENNSYLVANIA; SAID BECK ASSIGNOR TO SAID PRICE

BATTERY-PLATE-FILLING MACHINE

Application filed April 17, 1929. Serial No. 355,744.

This invention relates to machines for filling the interstices in storage battery grids with activating chemicals in the form of a pasty mass.

In order to obtain the best results in grid plates of the type indicated, the pasty mass must be of proper and uniform density and applied equally to all of the several openings of the battery grid. If the mass is packed too densely in the grid openings the acid does not act properly on all its parts, while if of insufficient density, the paste falls out and the grid soon becomes useless.

Stated in general terms the machine consists of a narrow stand of considerable length having at the front end a level table upon which the grids are laid singly.

Preferably the grids are cast double, partially separated by deep grooves at their juncture and provided with flat lugs at one corner to which electrical connections are made when assembled in the battery cells.

An adjustable bar arranged transversely of the table intercepts grids of undue thickness, preventing them from passing between a pair of feed rolls by which they are advanced under a hopper supplied with the filling material.

The hopper is fed from a mixing tank arranged over the table and in which a series of agitators stir the plastic mass and deliver to a spiral conveyor in the bottom to drop into the hopper by gravity, there to be further mixed and pressed by the vanes of flat ended, vertical propellers directly into the interstices of the grids, embedding the mass uniformly and producing a smooth level upper surface flush with the ribs of the metal grids.

The grids are advanced horizontally upon a track engaging their ends, past the edges of a series of moving spring scavenger plates, acting in the manner of wipers or scrapers in producing a smooth level under surface on the inlays, the grids being further guided by a center rail of angular cross section engaging the grooves therein.

Further continuous movement is imparted by conveyor chains at the ends of the grids, the end edges of which pass by gravity down inclines to hang vertically in spaced relation by the lugs, in which condition a partial drying effect is produced, the grids eventually being deposited automatically in containers while awaiting assemblage in the battery cells.

The machine is power driven, chain and gear transmission used exclusively, and provision made for adjustments wherever required.

One of the objects of the invention is to provide a machine adapted for continuous operation upon a plurality of grids presented to it consecutively and includes all of the several steps, as filling, pressing, smoothing, drying and stacking.

A further feature is in the provision of means for operating upon a double grid plate in an unusually rapid manner, producing uniformly dense inlays entirely free from holes, in a manner superior to hand labor and which may be successfully operated by inexperienced persons, the work being automatically performed in all of its several stages.

These and other advantageous objects, which will become apparent as the description progresses, are accomplished by the novel construction, combination and arrangement of parts hereinafter described and illustrated in the accompanying drawings, forming a material part of this disclosure, and in which:—

Figure 1 is a general side elevational view of the forward portion of a grid plate filling machine made in accordance with the invention.

Figure 2 is a front view of the same drawn to an enlarged scale.

Figure 3 is a transverse sectional view taken on line 3—3 of Figure 1.

Figure 4 is an enlarged longitudinal sectional view of the front portion of the machine showing the feed means, hopper and distributing chamber with the operative parts therein.

Figure 5 is a similar sectional view of the rear portion of the machine showing the grid brushing, and position changing devices.

Figure 6 is a transverse sectional view taken on line 6—6 of Figure 5.

Figure 7 is a similar sectional view taken on line 7—7 of Figure 5.

Figure 8 is a fragmentary plan view of one of the battery grid plates.

Figure 9 is an enlarged transverse sectional view of the same, taken on line 9—9 of Figure 8.

Figure 10 is a longitudinal sectional view taken on line 10—10 of Figure 8.

Figure 11 is a side elevational view, partially in section of the rear portion of the machine showing the delivery means.

Figure 12 is a partial view of the same, shown in a different position.

The machine is shown to be composed of a bed comprised of two opposed channel beam members 15 supported by legs 16 and having at their rear ends smaller channels 17 registering with the upper surface of the bed and supported at their outer ends on similar legs.

A shelf 18 is pendently supported from the beams 15 to carry a motor 19 directly connected with a speed reducing gear train enclosed in a casing 20 mounted on the shelf, from which extends a transverse shaft 21 on which is fixed a sprocket 22 arranged to drive a chain 23 trained over a sprocket 24 fixed on the main drive shaft 25 journalled in bearings carried by the underside of the beams 15 near their front ends.

A shelf 26 is fixed to the front of the forward leg and may be adjusted for height, this shelf supporting one or more stacks of the grids G to be filled.

Extending rigidly between the beams 15 is a platen 27, substantially level with their upper surfaces, on which the grids are placed singly and advanced by hand between spaced parallel guides 28 secured on the beams to extend lengthwise at both sides of the bed.

Secured adjustably over the platen 27 is a flat bar 30 acting as a gage limiting the thickness of the grids, as passed below it on the way to enter between a pair of corrugated or knurled feed rolls 31—32, respectively upper and lower, the latter being housed at its ends in bearings fixed in the beams 15 so that the periphery of the roll is level with the surface of the platen.

The upper roll 31 is journalled at its ends in bearings 33 carried in brackets 34 and pressed against the mating roll by springs 35 adjusted by screws 36.

The roll ends on the front side of the machine are provided with spur gears 37—38, the latter, lower roll end having secured on it a sprocket 39 engaged by chain 40 trained over a sprocket 41 fixed on the drive shaft 25. The circumference of the rolls 31—32 are preferably equal to the full length of one of the grids G so that one full revolution of the rolls advances a single grid into the machine.

A sprocket 42, fixed on the rear end of the drive shaft 25, has trained over it a chain 43 engaging another sprocket 44 freely rotatable on a shaft 45 journalled in a branched bracket 46 secured on the rear beam 15 to extend over it.

The sprocket 44 has on its rear side a toothed clutch element 47 engageable by a mating element 48 keyed to slide on the shaft 45 and engaged or disengaged by a hand lever 49 pivoted to a part of the bracket 46.

On the forward end of the shaft 45 is fixed a bevel gear 50 meshed with a mating gear 51 secured to the outer projecting end of a shaft 52 journalled at its ends in the flanged circular ends of a hopper 53, supported centrally above the platen 27 on an arched bracket 54 having its down-reaching ends bolted to the beams 15 to straddle the platen.

One or more shafts 55 are journalled in the upper portion of the hopper 53, which is completely open at the top, and on the front extending end of the shaft 55 is a sprocket 56 driven by a chain 57 trained over a sprocket 58 fixed on the shaft 52 adjacent the bevel gear 51.

Secured on the shaft 55 are a series of stirring arms 59 having opposed outturned terminals adapted to effectually agitate and mix the mass within the hopper.

The lower portion of the hopper 53 is semi-circular in cross section and fixed on the shaft 52, disposed axially therein, is a spiral feed screw 60 the periphery of which moves closely adjacent the inner surface of the wall of the hopper.

An opening 61 in the rear end plate of the hopper allows the pasty contents to exude, under the action of the screw 60, and pass down an inclined chute 62 to enter a distributing chamber 63.

The platen 27, which has a level horizontal surface, is recessed or cut away at the rolls 31—32 and at the rear inner end of the platen is an open track consisting of a pair of rails 64 to support the grids and a central raised angular guide rail 65 connected at intervals by cross bars 66, the outer edges of the rails 64 being close to the side guides 28.

Rearward of the chamber 63 is a pair of raised brackets 70 integrally connected by a cross member 71 having on its front surface two vertical under-cut guides 72—72' in which are engaged slides 73—73' provided with gibs and set screws to hold them in adjustment.

Extending from the tops and bottoms of the slides 73—73', towards the front, over the chamber 63 are upper and lower pairs of arms 74—74' in which are revolubly mounted four vertical spindles 75 arranged in pairs, each spindle having fixed collars 76 resting on the lower arms and limiting their movement downward.

The spindles 75 are pressed downwardly by springs 77 encircling them below the upper arms and exerting their effect on other collars 78 fixed to the spindles.

The upper extending ends of the spindles have secured to them spur gears 79 meshed in pairs on the front and rear sides of the machine, whereby the front spindles are rotated in a direction reverse to the rear spindles.

Above the gears 79, on the rear spindle, are fixed bevel gears 80 normally in mesh with mating gears 81 secured on the inner ends of two alined shafts 82, mounted to rotate in bearings 83 formed in forwardly extending elements at the upper ends of the brackets 70.

Collars 85, provided with set screws, engage the shafts on the inner sides of one of the bearings, while on the outer sides of the bearings are revolubly mounted sprockets 86 having disposed against their outer faces frictional discs 87, such for instance as leather, to be forced into operative contact by hand nuts 88 screw threaded on to the extending ends of the shafts, as best seen in Figure 3.

Trained over the sprockets 86 are chains 90 driven by sprockets 91 fixed on the ends of a shaft 92 disposed transversely below the bed in brackets carried by the beams 15, the shaft also having fixed upon it a sprocket 93 engaging a chain 95 trained over the sprocket 94 on the drive shaft 25.

A series of horizontal stirring elements or wings 96 are secured in spaced relation to the vertical spindles 75 to extend outward a considerable distance and at various relative angles in a spiral form, constantly agitating the plastic mass in the chamber 63 as received from the hopper 53 in which it is originally entered.

The grids G, as seen in Figures 8, 9 and 10 are formed in two sections R and L, respectively right and left, having a groove S between their frames F in which are slots interrupted by connecting members C which slide freely on the guide rail 65.

The frames F have at their upper corners extending lugs H to rest on the track rails 64 and connecting between the frame members are the rib elements T, which, as may be seen, are of triangular cross section, and so arranged as to present angularly framed interstices I by which the paste filling is held firmly when pressed therein.

Rigidly secured to the lower ends of the spindles 75 are distributing propellers 98, and 98' respectively right and left hand, each having two opposed flukes and level bottoms normally seating on the grids as passed below, the angularity of the flukes being such as to press the paste into the interstices of the grids in an effective manner causing solid embedment, as the grids move over the level surface of the platen 27.

It is to be noted that the front propeller 98 on the left hand side of the machine will turn in clock-wise direction, as will also the rear propeller 98' on the right hand side, the others moving reversely, thus causing an effective flowing of the material.

The right hand propellers press the paste against the forward ribs and the left hand propellers press the paste against the rear ribs and due to the angularity of the propeller blades and their right and left hand motion, the paste is pressed uniformly, producing a smooth level upper surface flush with the ribs of the grids.

It is to be noted that each spindle is independently adjustable, that each is provided with an individual spring to press them downwardly and furthermore are actuated by an adjustable friction drive, so that in the event of trouble occurring in the chamber, the driving device will slip and avoid damage.

At the front wall of the chamber 65 are guide brackets 100 slotted to receive thumb screws 101 by which the chamber is adjustably secured, these brackets having outturned upper ends rigidly engaged with a bar 102 mounted transversely above the bed upon the brackets 34.

At the rear wall of the chamber is a guide bar 103 rigidly carried by the machine and provided with slots to receive similar screws 101 to retain the rear wall in adjustment.

Pairs of clips 104 and 104' on the front and rear walls of the chamber provide means for the attachment of coiled tension springs 105—105', their lower ends being engaged in eyes 106—106' set in the elements 100—103 thus drawing the chamber wall downwardly.

On each side of the chamber are fixed clip brackets 107 carrying screws 108 having their points impinging on the horizontal portions of the grid guide rails 28 these screws being provided with lock nuts to retain them when adjusted so as to maintain the lower edges of the chamber walls at an appropriate height to permit passage of the grids therebelow.

It may be noted that the front wall of the chamber 63 is reduced in height to receive the inlet from the mixing hopper, and that the bottom of the chamber is entirely open except for a bar 109 passing centrally from front to rear over the grid groove S as disposed on the track rail 65.

The chain 95, as shown in Figure 1, not only communicates motion to the sprocket 93 but continues rearwardly, its upper run passing under an idle roll 110, over a sprocket 111, under another idle roll 112, around another sprocket 113, the return or lower run passing under a final idle roll 114 to the driving sprocket 24.

The sprocket 111 is fixed on the extending end of a shaft 115 journalled in bearings in the beams 15 through which it passes in parallel to a similar shaft 116 spaced towards the front of the machine.

Mounted on the shafts 115 and 116 are pairs of sprockets 117—117 and 118—118 around which are trained chain conveyors 119—119' carrying pairs of thin rubber sheets 120 having between them thin metal spring re-inforcing plates 120' extending in such position as to wipe or brush the lower surfaces of the filled grids as they move over them.

These plates are provided with cut-outs 121 to clear the center rail 65 of the track over which the grids move and are supported between clamp bars 122 fixed at spaced intervals to extend between the conveyor chains 119—119', as best seen in Figures 5 and 6.

After each wiper has performed its function of wiping excess paste from the grid plate and rendering it smooth and level, it passes over a knife-shaped wiping bar 123, held on a shelf 124 suspended from the bed, this bar scraping the wiper clean of paste, after which the wiper edge passes through a tray 125 filled with water, cleansing the wiper of all accumulations preparatory to its succeeding action.

The grids continue to advance towards the rear end of the machine, over the track, which terminates at the ends of the beam 15, to pass onto the bed portion 17, their extending ends being received on conveyor chains 130 moving rearwardly over the upper surfaces of guides 131 secured on the tops of the lesser beams 17, as seen in Figure 7.

The conveyor chains 130 pass around sprockets 132—133, respectively front and rear, these sprockets being secured to shafts 134—135 arranged in alined sections and journalled in bearings on the outer sides of the beams 17.

In order to drive the sections of the forward shaft, each section is provided with spur gears 136—136' meshed with mating gears 137—137' fixed on a shaft 138 suspended below the bed.

The section of the shaft 134 on the front side of the machine is extended outwardly and has fixed to it the sprocket 113 by which motion is communicated from the chain 95 to all the several shaft sections and conveyor chains.

As the grids become engaged by the conveyor chains their position is changed from horizontal to vertical, as they pass over the end of the track, their lower edges moving over an inclined plate 139 to hang pendent, in spaced relation on the supporting guide rails 131 while being advanced by the conveyor chains 130.

Below the rear extending portions of the beams 17 is a fixed stand 140 rearwardly adjacent the beam supports 141, the stand having a level upper surface constituting a table top 142 on which may be placed a container 143 open at its top and having notches 144 in its side edges to receive the grid projections H as the grids become released from the conveyors 130 as they pass over the sprockets 133 at the end of the machine.

Mounted in brackets extending below the table top 142 are shafts 145—146, respectively front and rear carrying spaced pairs of sprockets 147—148, around which are trained conveyor chains 149 the upper runs of which move along the edges of the table 142 and fixed at intervals on the chains are raised lugs 150 to engage the container and advance it along the table.

The forward shaft 145 has fixed at its front end a ratchet wheel 151 the teeth of which are engageable by a spring pressed pawl 152 pivoted on a bar 153 at 154, the bar having an elongated slot 155 through which the shaft 145 freely passes, the bar being normally drawn outwardly to the limit of the slot by a tension spring 156.

In the outer end of the bar 153 is another slot 157 through which passes a shaft 158 mounted in bearings carried on the support 141.

On the outer end of the shaft 158 is a cam 159 impinging on a roll 160 rotatably secured on the bar 153 and by which the bar is moved longitudinally against the tension of the spring 156 in actuating the ratchet 147.

Fixed on the shaft 158 are a pair of spaced sprockets 161 driven by the chain 130, the lower run of which is downwardly looped between idle wheels 162—162' mounted below the beams 17.

Thus it will be seen that by the cam actuated conveyor chains 149, the container is advanced intermittently and in timed relation to receive the grids as delivered to it from the conveyors 130.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described the invention, what is claimed as new and desired to secure by Letters Patents, is:—

1. A storage battery grid filling machine comprising a bed having raised guides at its lateral edges, a level platen at the front end of said bed, an adjustable gage bar under which the grids are moved, feed rolls to advance the grids, a distributing chamber for the filling material, spaced helical blades rotated in reverse relation in said chamber to force the material into the openings in said grids as they advance over the platen, a track on said bed beyond the platen, and means to drive said rolls and blades, whereby the filled grids are moved along the track.

2. A storage battery grid filling machine comprising a bed having raised guides at its lateral edges, a level platen at the front end of said bed, an adjustable gage bar under which the grids are moved, feed rolls to advance the grids, a distributing chamber for the filling material, spaced helical blades rotated in reverse relation in said chamber to force the material into the openings in said grids as they advance over the platen, a track on said bed beyond the platen, conveyors at the sides of the bed to carry the grids when discharged from said track, said grids moving from a horizontal to a vertical plane, and means for actuating said rolls, blades and conveyors in timed relation.

3. In a grid filling machine, a dispensing chamber, means to supply said chamber with material, a platen below the chamber over which the grids are moved, means of adjusting the height of said chamber relative to the platen, resilient means for pressing the chamber downwardly on the adjusting means, guides for the chamber, and a plurality of propellers rotated in diverse directions to force the material into the interstices of the grids while moving.

4. In a grid filling machine having a platen, a hopper, a dispensing chamber to receive material from said hopper, means to adjust said chamber relative to the platen, a series of vertical shafts driven in opposed paired relation extending into said chamber, helical propellers having flat ends fixed on said shafts, stops on said shafts limiting their downward motion, springs pressing said shafts against said stops, and a plurality of stirring elements disposed in spaced staggered relation fixed on said shafts above said propellers.

5. In a grid filling machine having a level platen, means to advance grids therealong, a dispensing chamber having openings in its bottom, means to adjust said chamber relative to the platen, a bracket fixed on the bed of the machine to extend above and partially over said chamber, a pair of slides mounted vertically in said bracket, said slides having forwardly extending arms, a pair of upright spindles geared to rotate in reverse directions, adjustable stops for each spindle, resilient means to press the spindles against the stops, and means on the bottoms of said spindles to press the plastic filling material into the interstices of the grids when moving below the openings in said chamber over said platen.

6. In a grid filling machine having a level platen, means to advance grids therealong, a dispensing chamber for the plastic filling material, pairs of springs pressed helical propellers arranged to rotate in opposite directions to press the material into the grid openings, means for driving said propellers, and means permitting removal of the pairs of propellers from said chamber.

7. In a grid filling machine having a platen at the front, a track at the rear, corrugated rolls for advancing grids entered therebetween over the platen and move them successively along said track, a plurality of resiliently pressed means for filling the interstices of the grids while passing over the platen, said means producing a smooth upper surface, and wiping elements remote from said filling means to smooth the under surface of the grids while moving over said track.

8. In a grid filling machine having platens at the front, a track at the rear, means for advancing a grid over the platen and track, means for filling the interstices of the grids while passing over the platen, endless conveyors moving below said track, and a plurality of flat spring brush plates carried by said conveyors to contact the under surface of the grids when moving over the track, said conveyors moving at a far greater speed than the grids.

9. In a grid filling machine having platens at the front, a track at the rear, means for advancing a grid over the platen and track, means for filling the interstices of the grids while passing over the platen, said means producing a smooth upper surface, endless conveyors rapidly moving below said track, a series of thin plates carried transversely between the conveyors to have their edges impinge on the under sides of the grids as advanced over the track, and means to cleanse said plates.

10. A battery grid filling machine, including means for finishing the upper surface of the grid coincidently with filling it, and a series of rapidly traveling resilient slickers remote from the first named finishing means to finish the lower surface of the grids as passed thereover.

11. A battery grid filling machine, a distributing chamber, a plurality of vertically mounted rotary members having opposed inclined faces on their lower ends to fill the interstices in the grids, said grids moving in a horizontal plane, means for scavenging excess material from the grids, and means for conveying the grids in a vertical position out of the machine.

12. A battery grid filling machine, including a receptacle to receive grid paste and having a discharge opening, means operative in said receptacle in vertical planes for forcing the paste into the interstices of the grids by a rubbing motion during their advancement, means for actuating the grids in a horizontal plane, and automatic means for discharging the grids when filled.

13. A battery grid filling machine, comprising a fixed horizontal platen, means for advancing grids thereover, a paste receptacle above said platen to deliver upon the grids, pairs of vertical rotary wipers respectively right and left, having their bottom faces inclined rearwardly, and means to actuate said wipers in opposite directions simultaneously.

14. A battery grid filling machine, comprising a platen, means for advancing grids thereover, a paste receptacle above said platen to deliver upon the grids, and inclined revolving blades journalled in vertical planes wholly within said receptacle to move over the surface of advancing grids to pack the paste into their interstices, said blades being also operative to trim excess material from the grid surface.

15. A battery grid filling machine, comprising a platen, means for advancing grids thereover, a paste receptacle above said platen to deliver upon the grids, a plurality of upright rotary elements having opposed blades oblique to their axis of rotation, said elements being contained within the receptacle means for actuating said elements to press paste into the grids and smooth their upper surfaces, and means for applying resilient pressure on said elements.

16. A battery grid filling machine, comprising a platen, means for continuously advancing grids thereon, a filling material receptacle having an outlet in the path of the advancing grids, means operative in the outlet for packing and smoothing the upper side of the grids, a trackway beyond said platen, and means below said track-way remotely spaced from the outlet for smoothing the under surface of the grids when moving over the track-way.

17. A storage battery grid filling machine, comprising a bed having a platen at the front, a track-way adjacent the platen, said trackway having a center rail engageable in central depressions of the grids, supports for the lugs on the ends of the grids extending beyond said trackway, means for advancing the grids, means for filling and smoothing the grids on said platen, means for smoothing the under side of the grids on said track-way, and means for turning the grids from a horizontal to vertical position on said supports whereby they are subjected to air drying.

18. In combination with a battery grid plate filling machine having a conveyor to carry the plates outwardly in spaced vertical relation and means for driving said conveyor, of a table below the plane of the conveyor, endless conveyors to pass over said table, said endless conveyors having lugs at intervals to engage a container receptive of the grids, and means actuated by the first conveyor driving means to intermittently actuate the last named container progressively.

19. In combination with a battery grid plate filling machine having a conveyor to carry the plates outwardly in spaced vertical relation, of a table therebelow to receive a container for the grids, and means to move the container intermittently over the table in timed relation with said conveyor to receive grids therefrom in relatively close proximity.

20. In a grid filling machine having a level platen, a pair of knurled rolls to advance grids therealong, a dispensing chamber for the filling material, means for adjusting the height of said chamber relative to the surface of the platen, a plurality of angularly faced distributers in said chamber to press material into the grid openings, adjustable resilient means to supply pressure on said distributors, and means for rotating said distributors in opposite directions.

21. In a grid filling machine having a level platen, a pair of knurled rolls to advance grids therealong, a dispensing chamber for the filling material, said chamber being open at the bottom, means for raising and lowering said chamber with reference to the platen, upright spindles rotatable in said chamber, means on the bottoms of said spindles to press material into the grid openings, said means being under resilient compression, and means to rotate said spindles in unison in opposite directions.

In testimony whereof we have affixed our signatures.

WILLIAM F. PRICE.
RUDOLPH H. BECK.